US011196371B2

(12) United States Patent
Wang et al.

(10) Patent No.: US 11,196,371 B2
(45) Date of Patent: Dec. 7, 2021

(54) SENSORLESS POSITION DETECTION FOR ELECTRIC MOTOR

(71) Applicant: DRiV Automotive Inc., Lake Forest, IL (US)

(72) Inventors: Rui Wang, Eindhoven (NL); Hendrik Huisman, Eindhoven (NL)

(73) Assignee: DRiV Automotive Inc., Lake Forest, IL (US)

( * ) Notice: Subject to any disclaimer, the term of this patent is extended or adjusted under 35 U.S.C. 154(b) by 62 days.

(21) Appl. No.: 16/739,704

(22) Filed: Jan. 10, 2020

(65) Prior Publication Data

US 2021/0218354 A1 Jul. 15, 2021

(51) Int. Cl.
*H02P 21/18* (2016.01)
*H02P 21/22* (2016.01)
*H02P 25/064* (2016.01)
*B60G 13/00* (2006.01)
(Continued)

(52) U.S. Cl.
CPC ............ *H02P 21/18* (2016.02); *B60G 13/003* (2013.01); *B60G 13/005* (2013.01); *H02P 21/13* (2013.01); *H02P 21/22* (2016.02); *H02P 25/064* (2016.02); *H02P 27/12* (2013.01); *B60G 2202/20* (2013.01)

(58) Field of Classification Search
CPC .......... H02P 21/18; H02P 21/22; H02P 21/13; H02P 27/12; H02P 25/064; H02P 21/06; H02P 21/141; H02P 21/26; H02P 21/28; B60G 13/003; B60G 13/005; B60G 2202/20; B60G 2219/41391; B60G 2219/37317; B60G 2219/37318
See application file for complete search history.

(56) References Cited

U.S. PATENT DOCUMENTS

| | | | |
|---|---|---|---|
| 5,644,205 A | * | 7/1997 | Nguyen Phuoc ....... H02P 21/18 318/400.23 |
| 6,543,146 B2 | | 4/2003 | Smith et al. |
| 6,667,597 B2 | | 12/2003 | Fedigan et al. |

(Continued)

FOREIGN PATENT DOCUMENTS

| | | |
|---|---|---|
| CN | 104723818 B | 2/2017 |
| CN | 108306569 A | 7/2018 |

OTHER PUBLICATIONS

W. Zhao, S. Jiao, Q. Chen, D. Xu, and J. Ji, "Sensorless collrol of a linear permanent-magnet motor based on an improved disturbance observer," IEEE Trans. Ind. Electron., vol. 65, No. 12, pp. 9291-9300, 2018.

(Continued)

*Primary Examiner* — Bickey Dhakal
(74) *Attorney, Agent, or Firm* — DRiV Automotive Inc.

(57) ABSTRACT

An apparatus includes an electric motor including a stator and a translator; a three-phase inverter electrically coupled to the electric motor; a power source electrically coupled to the three-phase inverter; and a controller communicatively coupled to the three-phase inverter. The controller is programmed to determine at least three measurements at different times of flux linkage from the electric motor, represent the measurements in Clarke coordinates, determine Clarke coordinates of a center of a circle defined by the Clarke coordinates of the measurements, and determine a position of the translator relative to the stator based on the Clarke coordinates of the center of the circle.

18 Claims, 8 Drawing Sheets

(51) Int. Cl.
*H02P 21/13* (2006.01)
*H02P 27/12* (2006.01)

(56) References Cited

U.S. PATENT DOCUMENTS

| | | | |
|---|---|---|---|
| 6,683,428 | B2 | 1/2004 | Pavlov et al. |
| 6,703,809 | B2 | 3/2004 | Royak et al. |
| 6,831,439 | B2 | 12/2004 | Won et al. |
| 6,841,969 | B1 | 1/2005 | Schulz et al. |
| 6,885,970 | B2 * | 4/2005 | Petrovic ............... G01P 3/44 318/747 |
| 6,924,617 | B2 | 8/2005 | Schulz et al. |
| 7,045,988 | B2 | 5/2006 | Ha et al. |
| 7,084,604 | B2 | 8/2006 | Salomaki |
| 7,230,403 | B2 | 6/2007 | Ho |
| 7,245,104 | B2 | 7/2007 | Tomigashi et al. |
| 8,674,638 | B2 | 3/2014 | Balazovic et al. |
| 8,884,566 | B2 * | 11/2014 | Cao ............... H02P 6/183 318/400.33 |
| 9,106,177 | B2 | 8/2015 | Son et al. |
| 9,160,262 | B2 | 10/2015 | Bozic et al. |
| 9,219,432 | B2 | 12/2015 | Huang et al. |
| 9,490,738 | B2 | 11/2016 | Nondahl et al. |
| 9,664,499 | B2 | 5/2017 | Negre |
| 9,667,186 | B2 | 5/2017 | Kim |
| 9,784,772 | B2 | 10/2017 | Costanzo et al. |
| 9,941,825 | B2 | 4/2018 | Wu et al. |
| 10,348,230 | B2 | 7/2019 | Hachiya et al. |
| 2002/0149337 | A1 * | 10/2002 | Thomas ............... H02P 21/06 318/700 |
| 2005/0137834 | A1 | 6/2005 | Heydt et al. |
| 2007/0069681 | A1 * | 3/2007 | Imura ............... H02P 6/182 318/717 |
| 2011/0043145 | A1 | 2/2011 | Wang et al. |
| 2012/0091941 | A1 * | 4/2012 | Hong ............... H02P 21/18 318/766 |
| 2015/0032423 | A1 | 1/2015 | Tang |
| 2016/0065109 | A1 | 3/2016 | Yamamoto et al. |
| 2016/0248354 | A1 | 8/2016 | Liu et al. |
| 2017/0250641 | A1 * | 8/2017 | Pramod ............... H02P 21/18 |

OTHER PUBLICATIONS

S. Bolognani, S. Calligaro, and R. Petrella, "Design Issues and Estimation Errors Analysis of Back-EMF-Based Position and Speed Observer for SPM Synchronous Motors," IEEE J. Emerg. Sel. Top. Power Electron., vol. 2, No. 2, pp. 159-170, 2014.

R. Wu and G. R. Slemon, "A Permanent Magnet Motor Drive without a Shaft Sensor," IEEE Trans. Ind. Appl., vol. 27, No. 5, pp. 1005-1011, 1991.

J. S. Kim and S. K. Sul, "New approach for high-performance PMSM drives without rotational position sensors," IEEE Trans. Power Electron., vol. 12, No. 5, p. 904—911, 1997.

N. Ertugrul and P. Acamley, "A New Algorithm for Sensorless Operation of PM Motors," IEEE Trans. Ind. Appl., vol. 30, No. 1, p. 126, 1994.

R. Leidhold and P. Mutschler, "Speed sensorless control of a long-stator linear synchronous motor arranged in multiple segments," IEEE Trans. Ind. Electron., vol. 54, No. 6, pp. 3246-3254, 2007.

M. Tomita, T. Senjyu, S. Doki, and S. Okuma, "New Sensorless Control for Brushless DC Motors Using Disturbance Observers and Adaptive Velocity Estimations," IEEE Trans. Ind. Electron., vol. 45, No. 2, pp. 274-282, 1998.

M. Linke, R. Kennel, and J. Holtz, "Sensorless Speed and Position Control of Synchronous Machines using Alternating Carrier Injection," in IEEE International Electric Machines and Drives Conference, 2003. IEMDC'03., 2003, pp. 1211-1217.

N. Bianchi and S. Bolognani, "Influence of rotor geometry of an IPM motor on sensorless collrol feasibility," IEEE Trans. Ind. Appl., vol. 43, No. 1, pp. 87-96, 2007.

F. Cupertino, P. Giangrande, G. Pellegrino, and L. Salvatore, "End effects in linear tubular motors and compensated position sensorless collrol based on pulsating voltage injection," IEEE Trans. Ind. Electron., vol. 58, No. 2, pp. 494-502, 2011.

H. Polinder, J. G. Slootweg, M. J. Hoeijmakers, and J. C. Compter, "Modelling of a linear PM machine including magnetic saturation and end effects: Maximum force to current ratio," IEMDC 2003— IEEE Int. Electr. Mach. Drives Conf., vol. 2, No. 6, pp. 805-811, 2003.

Notification of Transmittal of International Search Report and the Written Opinion of the International Searching Authority regarding International Application No. PCT/US2020/066781 dated Mar. 31, 2021 (11 pages).

* cited by examiner

SENSORLESS POSITION DETECTION FOR ELECTRIC MOTOR

BACKGROUND

Vehicles typically include suspension systems. The suspension system of a vehicle is coupled to the vehicle frame and to each wheel assembly. The suspension system absorbs and dampens shocks and vibrations from the wheel assemblies to the vehicle frame. For each wheel assembly, the suspension system includes an upper control arm, a lower control arm, a coil spring, and a shock absorber. The shock absorber extends through the coil spring. One end of the shock absorber and the coil spring may be connected to the lower control arm, and the other end of the shock absorber and the coil spring may be connected to the upper control arm or to the vehicle frame. The shock absorber is typically hydraulic or pneumatic, but the shock absorber can instead be electromagnetic, in which an electric motor serves to absorb and dampen shocks and vibrations transmitted to the wheels by a road surface.

DETAILED DESCRIPTION

Figure 1:
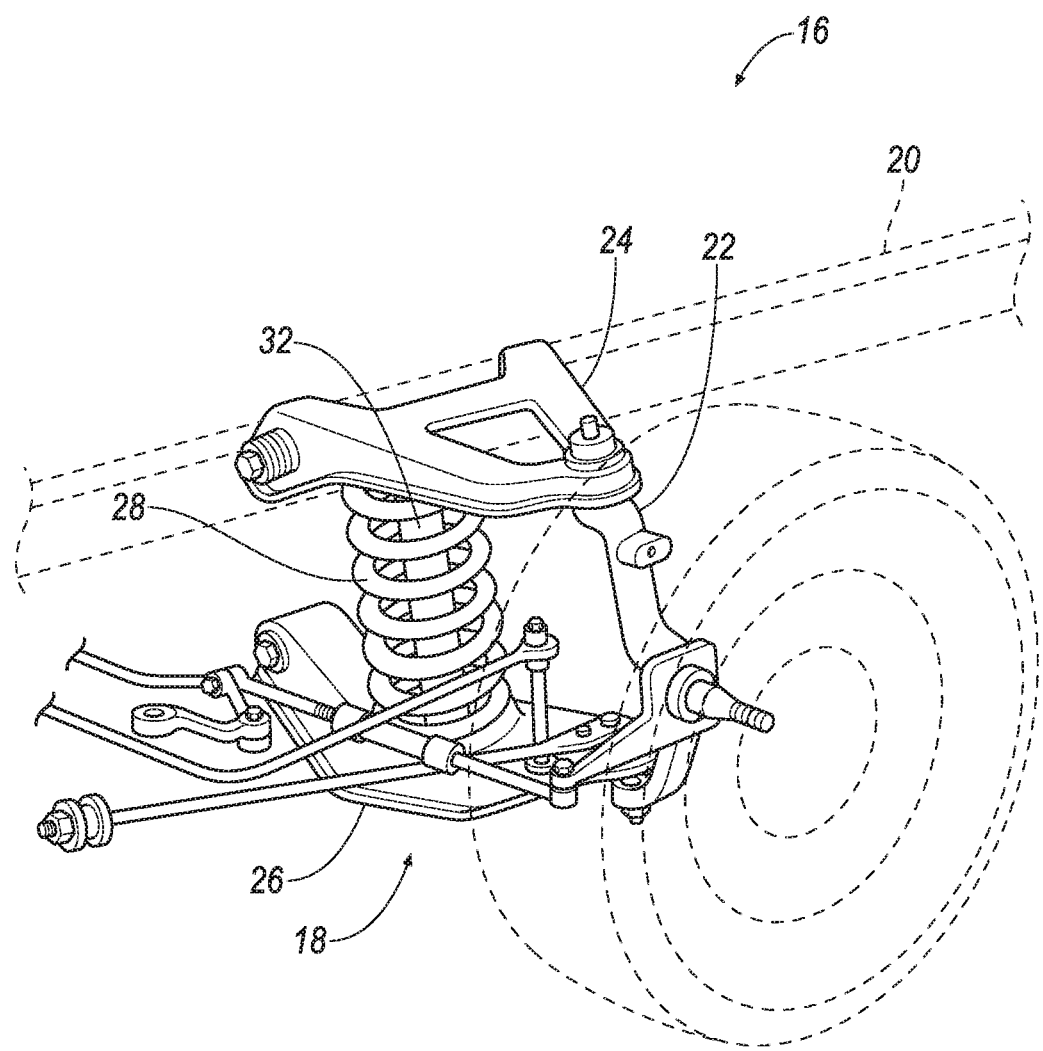
FIG. 1 is a perspective view of an example suspension system.

With reference to the Figures, an apparatus 30 includes an electric motor 32 including a stator 34 and a translator 36; a three-phase inverter 38 electrically coupled to the electric motor 32; a power source 40 electrically coupled to the three-phase inverter 38; and a controller 42 communicatively coupled to the three-phase inverter 38. The controller 42 is programmed to determine at least three measurements at different times of flux linkage from the electric motor 32, represent the measurements in Clarke coordinates, determine Clarke coordinates of a center of a circle 600 defined by the Clarke coordinates of the measurements, and determine a position of the translator 36 relative to the stator 34 based on the Clarke coordinates of the center of the circle 600.

The electric motor 32 can be used as component of a suspension system 18 for a vehicle 16, specifically as a shock absorber. An advantage of the electric motor 32 following the method described below over a different type of shock absorber is that a position sensor can be eliminated or double-checked. The apparatus 30 can be used for regenerative shock absorption, i.e., for charging the power source 40 using road vibrations. The apparatus 30 and the method described herein provide sensorless control for the electric motor 32, whether or not the apparatus 30 is part of the suspension system 18. Omitting a position sensor 56 simplified the design of the electric motor 32 and provides a considerable cost reduction. Alternatively, the method can provide a check on the functioning of the position sensor 56, if present. The method provides an efficient manner to compensate for errors in measuring the flux linkage through the electric motor 32. The method avoids using filters, and the method can provide reliable information about the position of the electric motor 32 across a wide range of frequencies, even low frequencies, of motion of the translator 36 relative to the stator 34.

With reference to FIG. 1, the vehicle 16 includes a vehicle frame 20, the suspension system 18 coupled to the vehicle frame 20, and a wheel assembly 22 coupled to the suspension system 18. The wheel assembly 22 is movable, e.g., vertically, relative to the vehicle frame 20 via the suspension system 18. For each wheel assembly 22 of the vehicle 16, the suspension system 18 includes an upper control arm 24, a lower control arm 26, a coil spring 28, and the electric motor 32. In the context of the suspension system 18, the electric motor 32 is an electromagnetic shock absorber. The electric motor 32 serves as the shock absorber and can replace a traditional hydraulic or pneumatic shock absorber. The electric motor 32 may supplement the coil spring 28, or the electric motor 32 may replace the coil spring 28. If both are present, the electric motor 32 can extend through the coil spring 28, as shown in FIG. 1. The electric motor 32 is coupled directly or indirectly to the vehicle frame 20 and the wheel assembly 22 so that as the wheel assembly 22 moves relative to the vehicle frame 20, the translator 36 moves relative to the stator 34, i.e., so that the translator 36 moves with one of the vehicle frame 20 and the wheel assembly 22 and the stator 34 moves with the other of the vehicle frame 20 and the wheel assembly 22. For example, one end of the electric motor 32 and the coil spring 28 may be connected to the lower control arm 26, and the other end of the electric motor 32 and the coil spring 28 may be connected to the upper control arm 24 or the vehicle frame 20. Specifically, one of the stator 34 and the translator 36 is fixed to the upper control arm 24 or vehicle frame 20, and the other of the stator 34 and the translator 36 is fixed to the wheel assembly 22. The electric motor 32 can serve as a shock absorber in other arrangements of suspension systems besides what is shown in FIG. 1.

Figure 2:
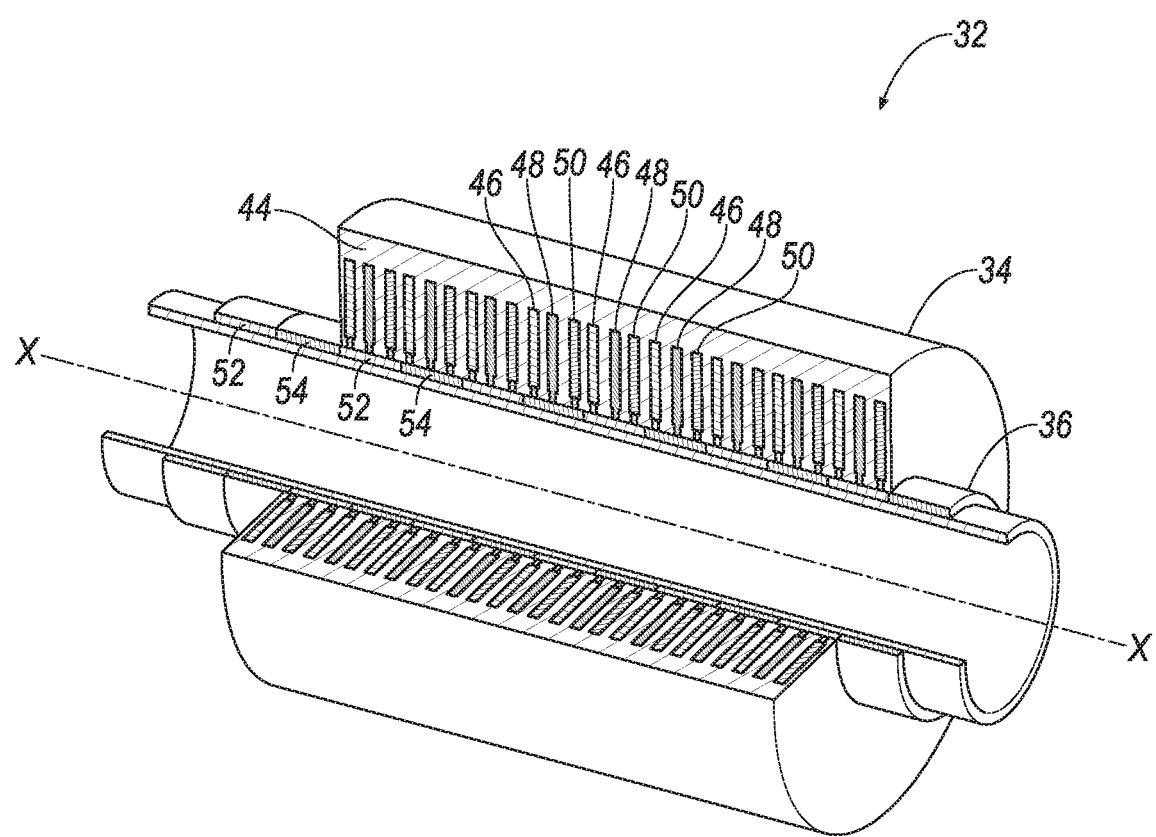
FIG. 2 is diagram of an example electric motor.

With reference to FIG. 2, the electric motor 32 functions as a motor and also functions as a generator. The electric motor 32 converts electrical energy to mechanical energy and vice versa. The mechanical energy takes the form of movement of the translator 36 relative to the stator 34. In the context of the electric motor 32 serving as a shock absorber, the translator 36 can move relative to the stator 34 because of road unevenness, and the electric motor 32 can resist the motion and/or move the translator 36 in response to motion caused by the road.

As shown in FIG. 2, the electric motor 32 is a permanent-magnet synchronous motor and is a linear electric motor. The electric motor 32 includes a stator 34 and a translator 36, which moves along an axis X relative to the stator 34. Alternatively, the electric motor 32 can be a rotary electric motor in which the translator 36 is a rotor that rotates about the axis X relative to the stator 34.

The stator 34 includes a core 44 of magnetic material and electric coils 46, 48, 50 wound around the core 44. The stator 34 receives three-phase electric power through the electric coils 46, 48, 50, which include a first coil 46, a second coil 48, and a third coil 50. The AC power supplied to the coils 46, 48, 50 creates a magnetic field that, combined with the field of permanent magnets 52, 54 of the translator 36, can generate a force parallel to the axis X (or torque about the axis X, if the electric motor 32 is rotary) on the translator 36.

The translator 36 includes a series of the permanent magnets 52, 54, specifically, a plurality of first permanent magnets 52 and second permanent magnets 54 alternating along the axis X (or alternating around the axis X if the electric motor 32 is rotary and the translator 36 is a rotor). The first permanent magnets 52 have opposite magnetic orientations than the second permanent magnets 54.

Figure 3:
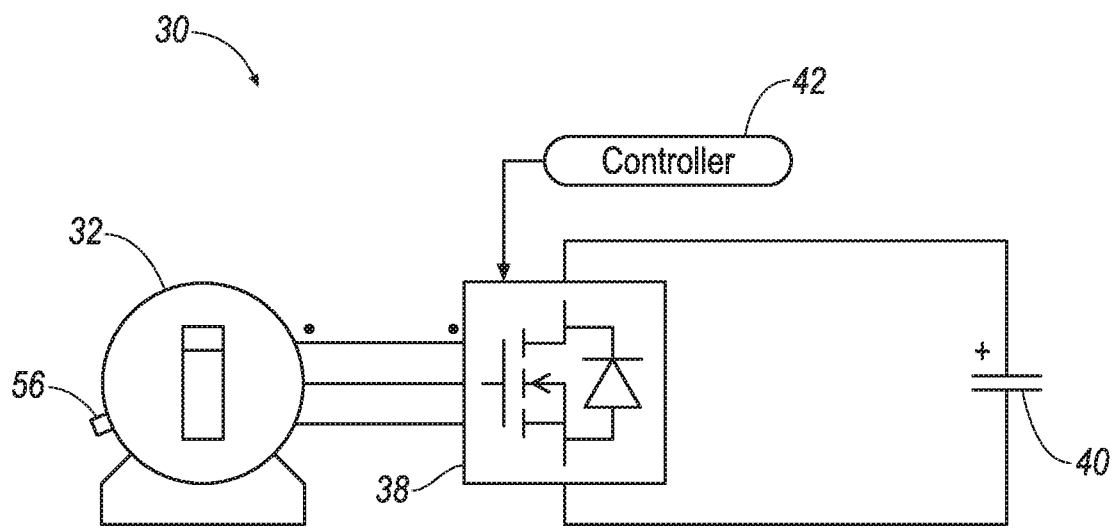
FIG. 3 is a circuit diagram of an apparatus including the electric motor.

With reference to FIG. 3, the three-phase inverter 38 is electrically coupled to the electric motor 32. The three-phase inverter 38 converts direct current from the power source 40 to alternating current delivered to the coils 46, 48, 50. The three-phase inverter 38 includes three inverter switch legs each connected to one of the coils 46, 48, 50.

The power source 40 is electrically coupled to the three-phase inverter 38. The power source 40 supplies direct current power to the three-phase inverter 38. The power source 40 can be one or more batteries, e.g., lithium-ion batteries, nickel-metal hydride batteries, lead-acid batteries, etc.; or one or more capacitors, e.g., a supercapacitor. In particular, the power source 40 can be a supercapacitor because supercapacitors recharge and discharge faster than batteries and can tolerate more charge-discharge cycles than batteries.

The controller 42 is communicatively coupled to the three-phase inverter 38 to provide a control signal to the three-phase inverter 38. The controller 42 can be a microprocessor-based computing device, e.g., an electronic controller or the like, a field-programmable gate array (FPGA), an application-specific integrated circuit (ASIC), etc. The controller 42 includes a processor, a memory, etc. The memory of the controller 42 includes media for storing instructions executable by the processor as well as for electronically storing data and/or databases. The controller 42 can be multiple controllers coupled together.

The apparatus 30 can include a position sensor 56 coupled to the electric motor 32 to detect a position of the translator 36 relative to the stator 34. The position sensor 56 may be any sensor providing an output mapping onto a linear (or rotary) position of the translator 36 relative to the stator 34, e.g., a capacitive transducer, a capacitive displacement sensor, an eddy-current sensor, an ultrasonic sensor, a Hall effect sensor, an inductive noncontact position sensor, a linear variable differential transformer, a piezoelectric transducer, a potentiometer, a proximity sensor, a linear coder, a string potentiometer, etc. As described below with respect to FIG. 8, the controller 42 can determine the position of the translator 36 relative to the stator 34 without using the position sensor 56 and can compare that result with the position as reported by the position sensor 56. Alternatively, the electric motor 32 can lack the position sensor 56, and the controller 42 can determine the position of the translator 36 relative to the stator 34 in a sensorless manner.

Figure 4:
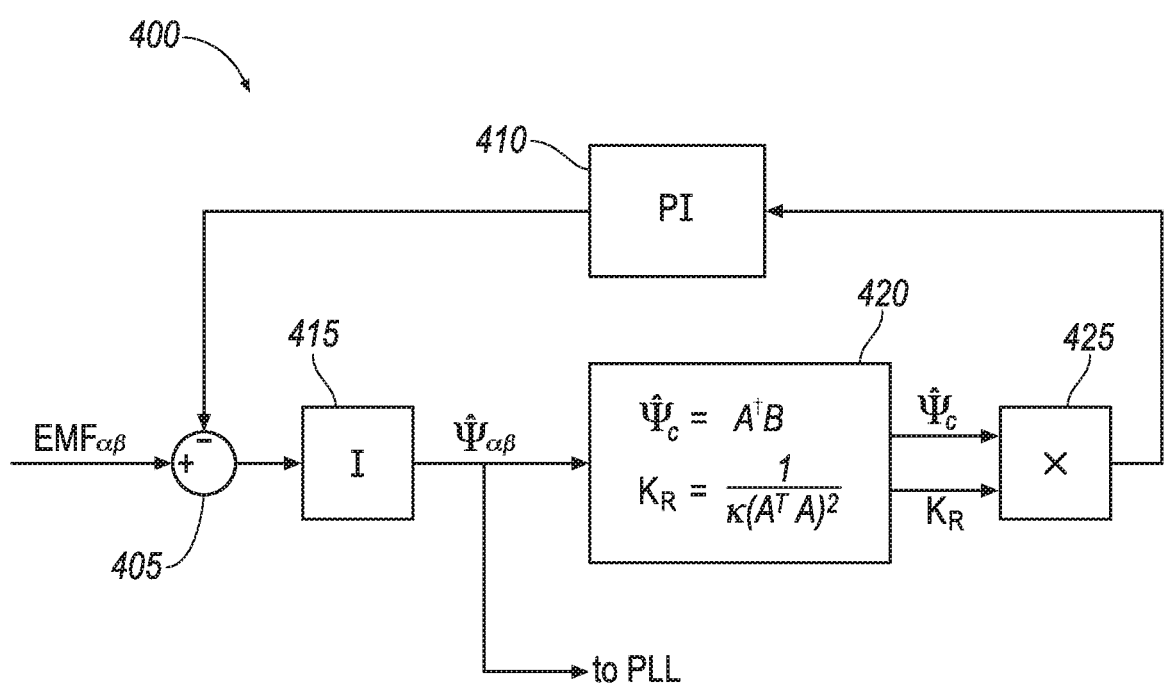
FIG. 4 is a feedback block diagram for determining a flux linkage of the electric motor.

With reference to FIG. 4, a feedback loop 400 is shown for compensating for offsets in the measured back-emf of the electric motor 32 to control the electric motor 32. The feedback loop 400 is performed by the controller 42. The memory of the controller 42 may store executable instructions for performing the steps of the feedback loop 400, or the controller 42 may include multiple controllers each programmed to perform some of the steps shown in FIG. 4 and coupled together to transmit data as shown in FIG. 4. As a general overview of the feedback loop 400, an uncompensated back-emf measurement $EMF_{\alpha\beta, i}^*$ is received from the electric motor 32, the offset in this measurement is compensated for by subtracting the output of a proportional-integral (PI) controller 410, the resulting compensated back-emf measurement $EMF_{\alpha\beta, i}$ is integrated to a flux-linkage measurement $\Psi_{\alpha\beta, i}$ by an integrator 415, at least three flux-linkage measurements $\Psi_{\alpha\beta, i}$ are used to determine a center $\Psi_c$ of a circle 600 defined by the flux-linkage measurements $\Psi_{\alpha\beta, i}$ in a center estimator 420, a weighting factor $K_R$ is determined, the center $\Psi_c$ and the weighting factor $K_R$ are multiplied in a multiplication block 425, and the PI controller 410 generates the compensation to feed into the summation block 405 based on the resulting product. The weighting factor $K_R$ is a scalar quantity representing the quality of the flux-linkage measurements $\Psi_{\alpha\beta, i}$ for determining the center $\Omega_c$. The current flux linkage $\Omega_{\alpha\beta}$, as compensated by the feedback loop 400, is used to actuate the electric motor 32 based on the position of the translator 36 relative to the stator 34.

The summation block 405 receives the uncompensated back-emf measurement $EMF_{\alpha\beta, i}^*$, which can be determined from the measured three-phase currents $i_{abc}$ and the measured stator 34 voltages $u_{abc}$. First, the three-phase currents $i_{abc}$ and the measured stator voltages $u_{abc}$ are transformed into Clarke coordinates by using the simplified Clarke transformation, also referred to as the alpha-beta transformation:

$$i_{\alpha\beta}(t) = Ti_{abc}(t) = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} i_a(t) \\ i_b(t) \\ i_c(t) \end{bmatrix}$$

$$u_{\alpha\beta}(t) = Tu_{abc}(t) = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} u_a(t) \\ u_b(t) \\ u_c(t) \end{bmatrix}$$

in which i is current, u is voltage, T is the Clarke transformation, t is time, and a, b, and c represent the first coil 46, the second coil 48, and the third coil 50, respectively. The Clarke transformation T is geometrically interpreted as a projection of a three-part quantity associated with the electric coils 46, 48, 50 onto two stationary axes, the α-axis and the β-axis, i.e., Clarke coordinates. All quantities in Clarke coordinates are thus two-dimensional vectors. The uncompensated back-emf measurement $EMF_{\alpha\beta, i}^*$ in Clarke coordinates can be determined from the three-phase currents $i_{\alpha\beta}$ op and the stator voltages $u_{\alpha\beta}$ in Clarke coordinates:

$$EMF_{\alpha\beta}^* = u_{\alpha\beta} - \begin{bmatrix} R_s + L_{s\alpha}\frac{d}{dt} & L_{s\alpha\beta}\frac{d}{dt} \\ L_{s\alpha\beta}\frac{d}{dt} & R_s + L_{s\beta}\frac{d}{dt} \end{bmatrix}i_{\alpha\beta}$$

in which $R_s$ is the winding resistance of the stator 34, $L_{s\alpha}$ is the synchronous inductance in the α dimension, $L_{s\beta}$ is the synchronous inductance in the β dimension, and $L_{s\alpha\beta}$ is the mutual coupling. In many cases, the contributions of the synchronous inductance and mutual coupling terms are negligibly small and can be ignored. The uncompensated back-emf measurement $EMF_{\alpha\beta, i}*$ is then fed into the summation block 405.

The summation block 405 subtracts the compensation from the PI controller 410 from the uncompensated back-emf measurement $EMF_{\alpha\beta, i}*$ to arrive at the compensated back-emf $EMF_{\alpha\beta, i}$. The compensation is initially (0, 0) and remains (0, 0) until a minimum number of measurements are collected for the center estimator 420, as described below.

The integrator 415 determines a flux-linkage measurement $\Psi_{\alpha\beta, i}$ from the compensated back-emf $EMF_{\alpha\beta, i}$ by integrating the compensated back-emf measurements $EMF_{\alpha\beta, i}$ over time:

$$\Psi_{\alpha\beta}(t)=\int_{t_0}^{t}EMF_{\alpha\beta}(\tau)d\tau+\Psi_{\alpha\beta}(t_0)$$

in which $\Psi_{\alpha\beta}(t_0)$ is the initial flux linkage. The flux-linkage measurements $\Psi_{\alpha\beta}$ are represented in Clarke coordinates. The integrator 415 can include two scalar calculations, one for the alpha terms and one for the beta terms.

Figure 6:
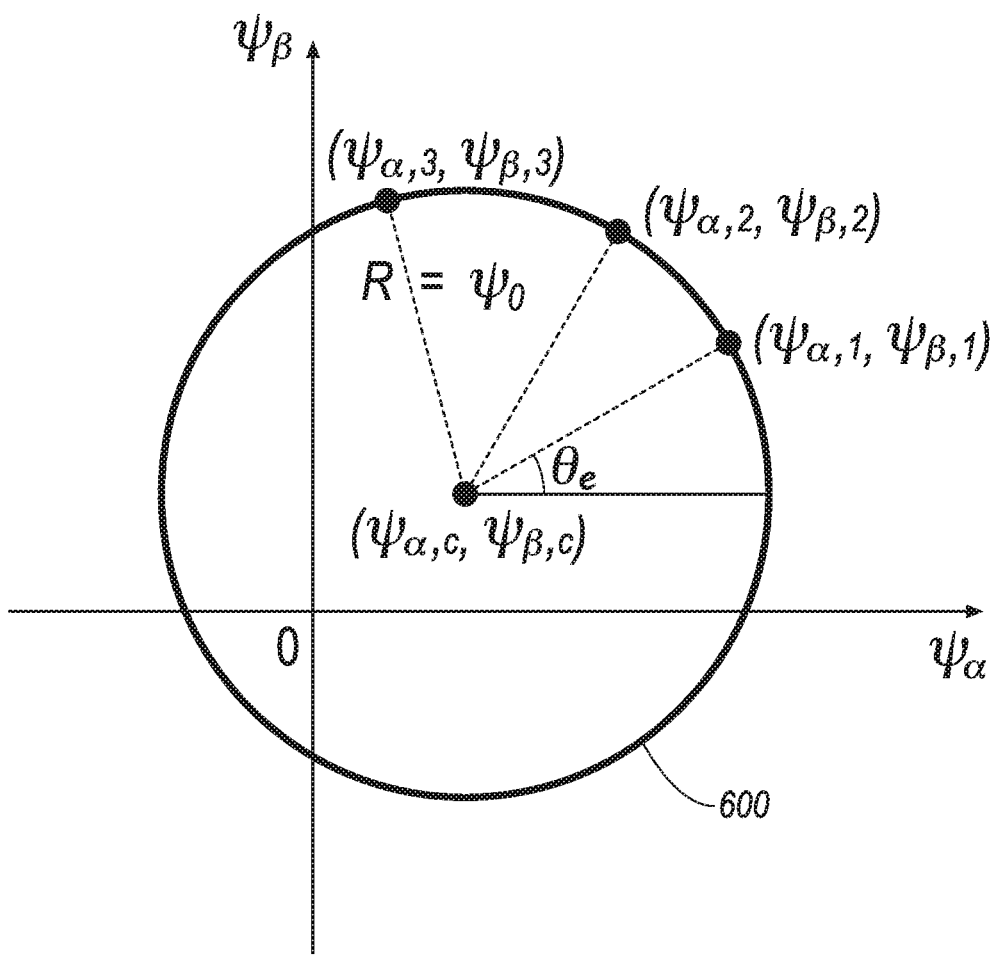
FIG. 6 is a plot of flux linkage of the electric motor in Clarke coordinates.

The center estimator 420 needs at least three flux-linkage measurements $\Psi_{\alpha\beta, i}$ at different times to determine the center $\Psi_c$ of the circle 600, as shown in FIG. 6. FIG. 6 shows the circle 600 with center $\Psi_c$ ($\Psi_{\alpha, c}, \Psi_{\beta, c}$). The circle 600 and thus the center $\Psi_c$ are defined by three flux-linkage measurements $\Psi_{\alpha\beta, i}$ at different points, $\Psi_{\alpha\beta, 1}=(\Psi_{\alpha, 1}, \Psi_{\beta, 1})$, $\Psi_{\alpha\beta, 2}=(\Psi_{\alpha, 2}, \Psi_{\beta, 2})$, $\Psi_{\alpha\beta, 3}=(\Psi_{\alpha, 3}, \Psi_{\beta, 3})$. By collecting at least four flux-linkage measurements $\Psi_{\alpha\beta, i}$, the center $\Psi_c$ is overdetermined, and the center estimator 420 can use least-squares estimation to determine the center $\Psi_c$. The center estimator 420 determines the center $\Psi_c$ of the circle 600 and the weighting factor $K_R$ in a process 500, which is described below. The center $\Psi_c$ and the weighting factor $K_R$ are multiplied together in the multiplication block 425, and the resulting weighted center $K_R\Psi_c$ is fed to the PI controller 410.

The PI controller 410 provides proportional and integral compensation to the center $\Psi_c$, specifically on the weighted center $K_R\Psi_c$. The weighted center $K_R\Psi_c$ provides the error function for the proportional and integral compensation, and (0, 0) is the setpoint. By outputting to the summation block 405, the PI controller 410 forms the feedback loop 400, in which the flux linkage $\Psi_{\alpha\beta}$ is proportionally and integrally compensated and then becomes one of the flux-linkage measurements $\Psi_{\alpha\beta, i}$ to determine the center $\Psi_c$ of the circle 600. The proportional compensation and integral compensation each correct for offsets to the center $\Psi_c$. The proportional compensation corrects for the initial flux linkage $\Psi_{\alpha\beta}(t_0)$. The integral compensation corrects for offset voltage. The PI controller 410 can include two scalar calculations, one of the alpha terms and one for the beta terms.

The output of the feedback loop 400 is the current flux linkage $\Psi_{\alpha\beta}$, which is compensated so that the center $\Psi_c$ is equal to (0, 0). With the center $\Psi_c$ corrected to (0, 0), the current flux linkage $\Psi_{\alpha\beta}=(\Psi_{\alpha}, \Psi_{\beta})$ provides the position of the translator 36 relative to the stator 34. Specifically, the angle $\theta_e$ of the current flux linkage $\Psi_{\alpha\beta}$ maps one-to-one onto the linear position of the translator 36 relative to the stator 34 along the axis X, so the angle $\theta_e$ can be taken as the position of the translator 36 relative to the stator 34. If the electric motor 32 is rotary, the angle $\theta_e$ directly describes the rotational position of the translator 36 around the axis X relative to a fixed reference point on the stator 34. The position $\theta_e$ is given by the equation $\theta_e=\arctan(\Psi_\beta/\Psi_\alpha)$. The controller 42 actuates the electric motor 32 based on the position $\theta_e$ of the translator 36 relative to the stator 34. For example, the controller 42 instructs the three-phase inverter 38 to move the translator 36 to a target position based on the actual position $\theta_e$ of the translator 36. The target position can be, e.g., a fixed position to which the translator 36 returns after absorbing a shock from a road.

Figure 5:
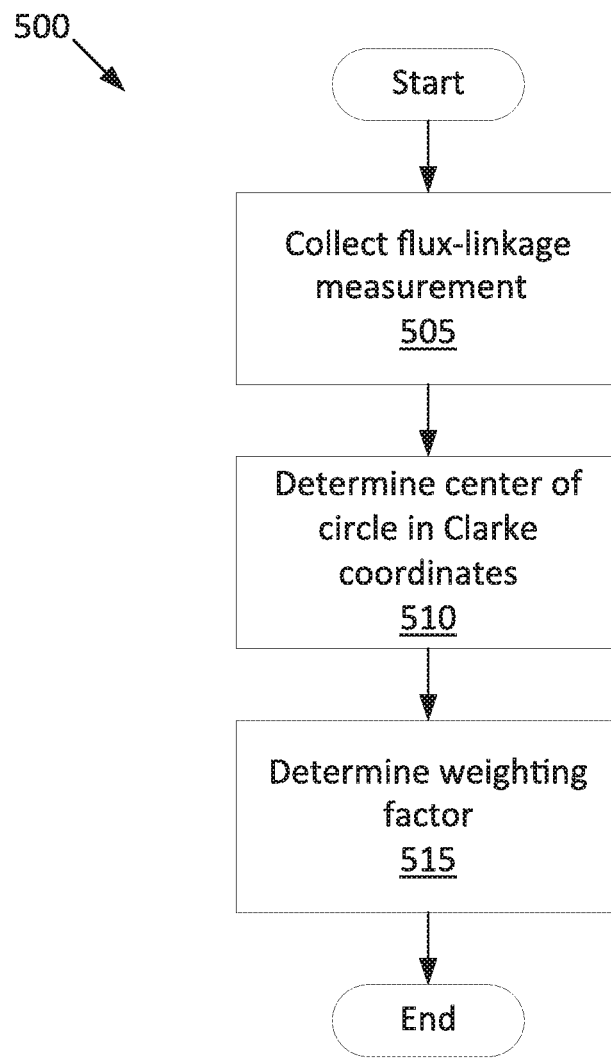
FIG. 5 is a process flow diagram of an example process for determining a center of a flux-linkage circle in Clarke coordinates.

FIG. 5 is a process flow diagram illustrating the exemplary process 500 for determining the center $\Psi_c$ of the circle 600 and the weighting factor $K_R$, i.e., what is performed by the center estimator 420 in the feedback loop 400. The memory of the controller 42 stores executable instructions for performing the steps of the process 500. As a general overview of the process 500, the controller 42 collects the flux-linkage measurements $\omega_{\alpha\beta, i}$, determines the center $\Psi_c$ of the circle 600, and determines the weighting factor $K_R$.

The process 500 begins in a block 505, in which the controller 42 collects the flux-linkage measurements $\Psi_{\alpha\beta, i}$. To determine the center $\Psi_c$ of the circle 600, the controller 42 needs at least three flux-linkage measurements $\Psi_{\alpha\beta, i}$. By collecting at least four flux-linkage measurements $\Psi_{\alpha\beta, i}$, the center $\Psi_c$ is overdetermined, and the controller 42 can use least-squares estimation to determine the center $\Psi_c$.

Next, in a block 510, the controller 42 determines the center $\Psi_c$ of the circle 600. Specifically, the controller 42 calculates the center $\Psi_c$ by applying least-squares estimation by applying the equation $\Psi_c=A^\dagger B$, in which the dagger symbol superscript ($\dagger$) represents the pseudoinverse of a matrix (also called the Moore-Penrose inverse), and A and B are given by $$A = \begin{bmatrix} \psi_{\alpha,1} - \psi_{\alpha,2} & \psi_{\beta,1} - \psi_{\beta,2} \\ \vdots & \vdots \\ \psi_{\alpha,N-1} - \psi_{\alpha,N} & \psi_{\beta,N-1} - \psi_{\beta,N} \end{bmatrix}$$

$$B = \frac{1}{2} \begin{bmatrix} \psi_{\alpha,1}^2 - \psi_{\alpha,2}^2 + \psi_{\beta,1}^2 - \psi_{\beta,2}^2 \\ \vdots \\ \psi_{\alpha,N-1}^2 - \psi_{\alpha,N}^2 + \psi_{\beta,N-1}^2 - \psi_{\beta,N}^2 \end{bmatrix}$$

in which $\psi_{\alpha, i}$ is the ith flux-linkage measurement in the alpha dimension in Clarke coordinates, $\psi_{\beta, i}$ is the ith flux-linkage measurement in the beta dimension in Clarke coordinates, and N is the number of flux-linkage measurements. The pseudoinverse of A is given by $A^\dagger=(A^TA)^{-1}A^T$, in which T is the transpose operator. The center $\Psi_c$ can be calculated with the following equation equivalent to $A^\dagger B$:

$$\Psi_c = \frac{1}{(\sum_{i=1}^{N-1} a_{i1}^2)(\sum_{i=1}^{N-1} a_{i2}^2) - (\sum_{i=1}^{N-1} a_{i1}a_{i2})^2}$$

$$\begin{bmatrix} \left(\sum_{i=1}^{N-1} a_{i2}^2\right)\left(\sum_{i=1}^{N-1} a_{i1}b_i\right) - \left(\sum_{i=1}^{N-1} a_{i1}a_{i2}\right)\left(\sum_{i=1}^{N-1} a_{i2}b_i\right) \\ \left(\sum_{i=1}^{N-1} a_{i1}^2\right)\left(\sum_{i=1}^{N-1} a_{i2}b_i\right) - \left(\sum_{i=1}^{N-1} a_{i1}a_{i2}\right)\left(\sum_{i=1}^{N-1} a_{i1}b_i\right) \end{bmatrix}$$

in which $a_{i1}$ is the element in the ith row and first column of the matrix A, i.e., $a_{i1}=\psi_{\alpha, i}-\psi_{\alpha, i+1}$; $a_{i2}$ is the element in in the ith row and second column of the matrix A, i.e., $a_{i2}=\psi_{\beta, i}-\psi_{\beta, i+1}$; and $b_i$ is the element in the ith row of the matrix B, i.e., $b_i=\frac{1}{2}(\psi_{\alpha, i}^2-\psi_{\alpha, i+1}^2+\psi_{\beta, i}^2-\psi_{\beta, i+1}^2)$. If the controller 42 has already determined the center $\Psi_c$ at least once, the controller 42 only needs to update the bottom row in each matrix A and B and move the rest of the rows up, i.e., make the ith row into the (i−1)th row. Thus, for each summation term in the above equation, the new summation term can be calculated by starting with the previous summation term result, subtracting the argument for i=1, and adding the argument for i=N; for example, for the summation term $\Sigma_{i=1}^{N-1} a_{i1} b_i$, the new result is the previous result, minus $a_{11}b_1$, plus $a_{N1}b_N$. This iterative updating allows for efficient use of computational resources.

Next, in a block 515, the controller 42 determines the weighting factor $K_R$. The weighting factor $K_R$ expresses the quality, e.g., signal-to-noise ratio, of the flux-linkage measurements. For example, the weighting factor $K_R$ is inversely related to a condition number $\kappa(.)$ of a matrix of the flux-linkage measurements $\Psi_{\alpha\beta, i}$. The condition number KO of a matrix is the ratio of the maximal singular value of the matrix to the minimal singular value of the matrix, i.e., $\kappa(M)=\sigma_{max}(M)/\sigma_{min}(M)$, in which M is an arbitrary matrix. The condition number ranges from 1 to infinity, with values close to 1 representing that calculations involving the matrix M will magnify noise by a relatively small amount, and large values representing that calculations involving the matrix M will magnify noise by a relatively large amount. Specifically, the weighting factor $K_R$ is given by an equation of this form:

$$K_R = \frac{1}{\kappa(A^T A)^x}$$

in which x is a positive number. In particular, x can equal 2. The weighting factor $K_R$ ranges from 0 to 1, with values close to 0 representing a large amount of noise in calculating the center $\Psi_c$, and values close to 1 representing a small amount of noise in calculating the center $\Psi_c$. After the block 515, the process 500 ends. In running the feedback loop 400, the controller 42 may perform the process 500 several times, e.g., once per time step of the controller 42.

Figure 7A:
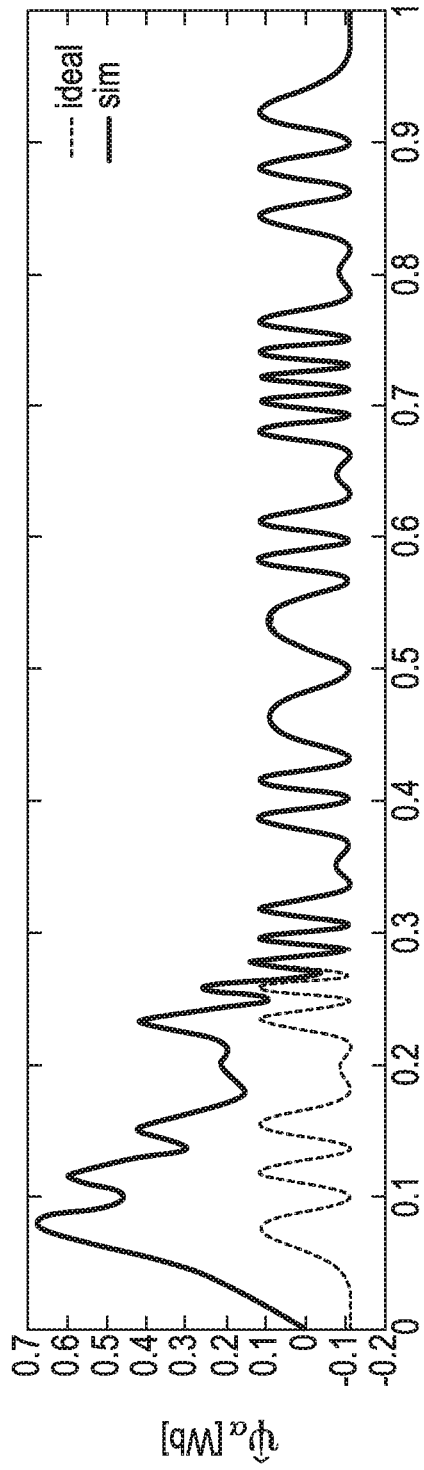
FIG. 7A is a plot showing the flux linkage of the electric motor in the alpha dimension versus time.
Figure 7B:
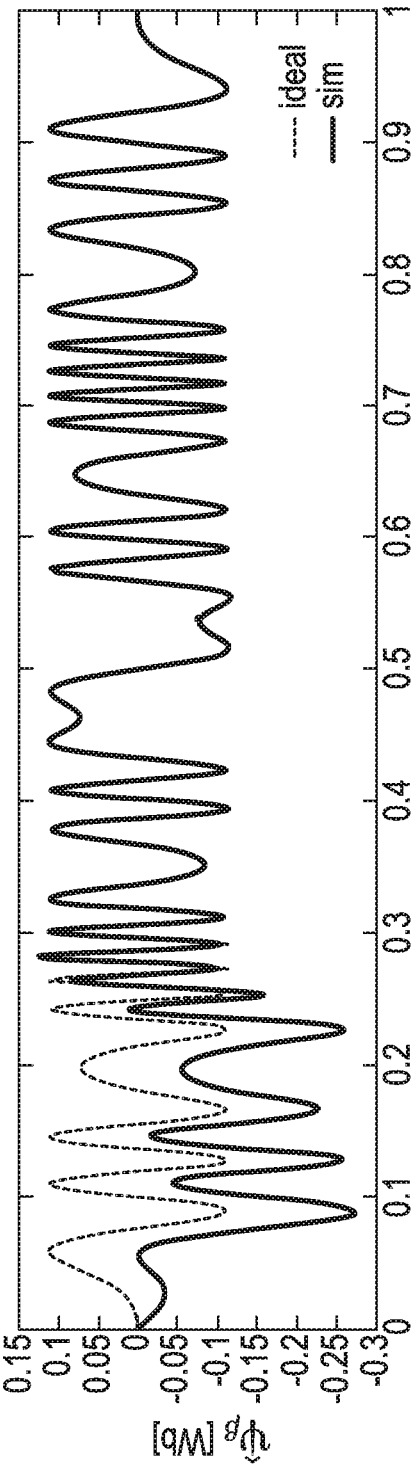
FIG. 7B is a plot showing the flux linkage of the electric motor in the beta dimension versus time.
Figure 7C:
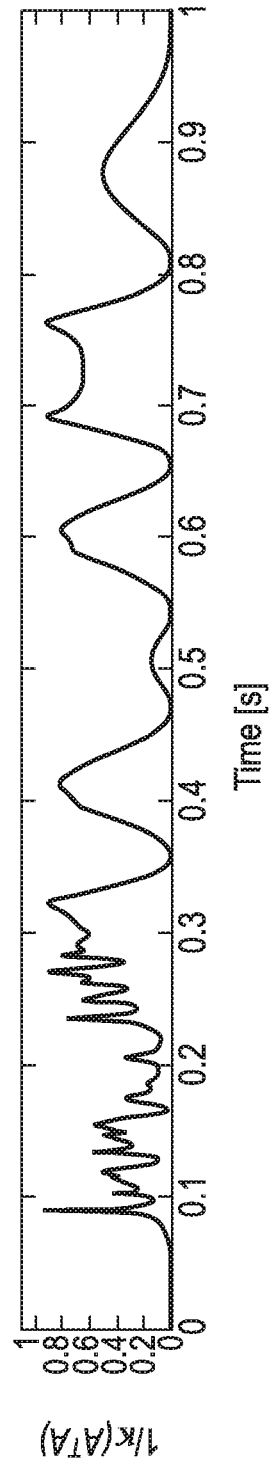
FIG. 7C is a plot of a weighting factor for the flux linkage versus time.
Figures 7D, 7E:
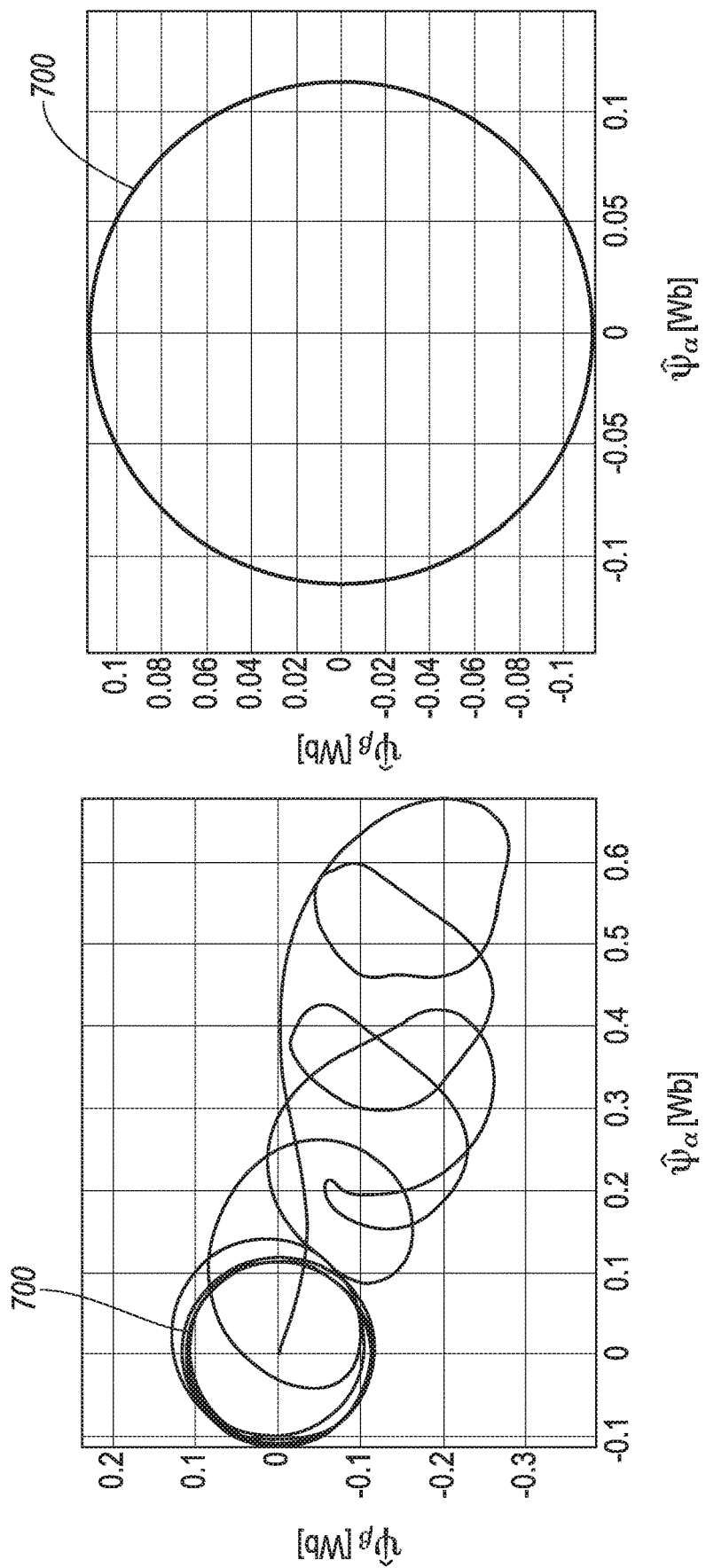
FIG. 7D is a plot of the flux linkage over a first timespan in Clarke coordinates.
FIG. 7E is a plot of the flux linkage over a second timespan in Clarke coordinates.

FIGS. 7A-E are plots showing the convergence of the center $\Psi_c$ over the course of running the feedback loop 400. FIGS. 7A and 7B show the elements of the flux linkage $\Psi_{\alpha\beta}=(\Psi_\alpha, \Psi_\beta)$ over time, with the dashed lines representing the true values of the flux linkage $\Psi_{\alpha\beta}$ and the solid lines representing the values of the flux linkage $\Psi_{\alpha\beta}$ outputted by the feedback loop 400. FIG. 7C shows the weighting factor $K_R$ over time. When the weighting factor $K_R$ is close to 0, the PI controller 410 provides comparatively less compensation, and when the weighting factor $K_R$ is close to 1, the PI controller 410 provides comparatively more compensation. FIG. 7D shows a trace of the flux linkage $\Psi_{\alpha\beta}$ in Clarke coordinates, starting from an initial position of (0, 0) at t=0 and converging to a circle 600 centered on (0, 0) by t=1. FIG. 7E also shows a trace of the flux linkage $\Psi_{\alpha\beta}$ in Clarke coordinates but for only t=0.8 to t=1, before which time the flux linkage $\Psi_{\alpha\beta}$ has converged to the circle 600 centered on (0, 0).

Figure 8:
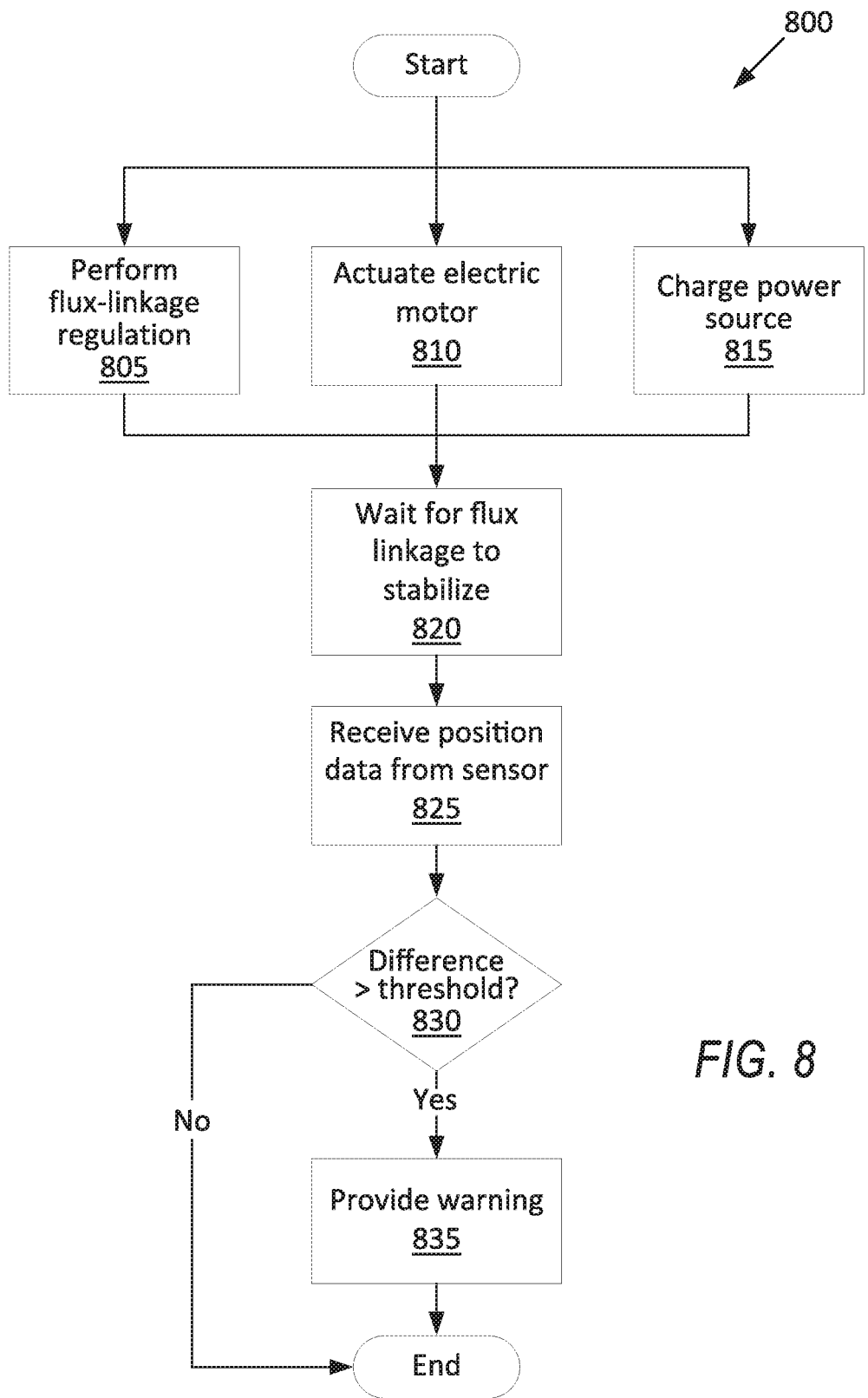
FIG. 8 is a process flow diagram of an example process for controlling the apparatus.

FIG. 8 is a process flow diagram illustrating an exemplary process 800 for controlling the apparatus 30. The memory of the controller 42 stores executable instructions for performing the steps of the process 800. As a general overview of the process 800, the controller 42 continuously performs flux-linkage regulation according to the feedback loop 400 in a block 805; continuously actuates the electric motor 32 based on the position of the translator 36 relative to the stator 34 in a block 810; optionally operates the electric motor 32 as a generator to charge the power source 40 in a block 815; after waiting for the measured flux linkage to stabilize in a block 820, continuously compares (in a decision block 830) the position according to the feedback loop 400 with a position received from the position sensor 56 in a block 825; and provides a warning if the difference between the reported positions is greater than a threshold in a block 835. "Continuously" performing a step means that the controller 42 continues performing the step as the process 800 moves to the next step. Thus, FIG. 8 shows an order in which the steps initialize, and once initialized, the blocks 805, 810, and 815 continue being performed as the remaining blocks are performed. As noted above, the electric motor 32 can be constructed without the position sensor 56, in which case the steps of comparing the positions and providing the warning are not performed.

In the block 805, the controller 42 performs the flux-linkage regulation described above with respect to the feedback loop 400 and the process 500. The feedback loop 400 outputs the current flux linkage $\Psi_{\alpha\beta}=(\Psi_\alpha, \Psi_\beta)$, from which the controller 42 calculates the position $\theta_e$ of the translator 36 relative to the stator 34 with the equation $\theta_e=\arctan(\Psi_\beta/\Psi_\alpha)$.

In the block 810, the controller 42 actuates the electric motor 32 based on the position $\theta_e$ of the translator 36 relative to the stator 34. Specifically, the controller 42 instructs the three-phase inverter 38 to move the translator 36 to a target position based on the actual position $\theta_e$ of the translator 36. For example, the target position can be a fixed position to which the translator 36 returns after absorbing a shock from a road.

In the block 815, the controller 42 charges the power source 40 with power generated by movement of the electric motor 32, i.e., with movement of the translator 36 relative to the stator 34. The electric motor 32 acts as a generator. In effect, the electric motor 32 provides regenerative shock absorption. For example, if the controller 42 is programmed to operate the electric motor 32 to mimic a conventional oil-based shock absorber, the electric motor 32 will recapture some of the energy that would have been expended heating the oil in the conventional oil-based shock absorber.

Next, in the block 820, the controller 42 waits for the center $\Psi_c$ of the circle 600 to stabilize to (0, 0), i.e., for the flux linkage $\Psi_{\alpha\beta}$ to stabilize to the circle 600 centered on (0, 0), as shown in FIG. 7E. For example, the controller 42 can wait for a preset time after beginning the process 800. The preset time can be chosen experimentally based on how long the flux linkage $\Psi_{\alpha\beta}$ typically takes to stabilize to the circle 600. For another example, the controller 42 can wait until the center $\Psi_c$ is within a preset distance from (0, 0) for a preset time. The preset distance can be chosen to be negligibly small, and the preset time can be chosen to sufficiently long to indicate that the center $\Psi_c$ has stabilized rather than coincidentally landed on (0, 0). While waiting, the controller 42 continues performing the flux-linkage regulation, actuating the electric motor 32, and charging the power source 40 as described in the blocks 805 to 815.

Next, in the block 825, the controller 42 receives data indicating a position $\theta_p$ of the translator 36 relative to the stator 34 from the position sensor 56.

Next, in the decision block 830, the controller 42 determines whether a difference $\Delta\theta$ between the position $\theta_p$ of the translator 36 from the sensor and the position $\theta_e$ of the translator 36 based on the center $\Psi_c$ of the circle 600 exceeds a threshold $\Delta\theta^*$, i.e., whether $\Delta\theta=|\theta_p-\theta_e|>\Delta\theta^*$. The threshold $\Delta\theta^*$ can be chosen based on a known resolution or noisiness of the position sensor 56. If the difference is greater than the threshold, i.e., $\Delta\theta>\Delta\theta^*$, the process 800 proceeds to the block 835. If the difference is less than the threshold, i.e., $\Delta\theta<\Delta\theta^*$, the process 800 ends or restarts.

In the block 835, the controller 42 provides a warning. For example, the controller 42 can transmit a diagnostic trouble code (DTC) indicating a fault and containing an appropriate code to an on-board diagnostics system of the vehicle 16. After the block 835, the process 800 ends.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. An apparatus comprising:
an electric motor including a stator and a translator;
a three-phase inverter electrically coupled to the electric motor;
a power source electrically coupled to the three-phase inverter; and
a controller communicatively coupled to the three-phase inverter and programmed to
determine at least three measurements at different times of flux linkage from the electric motor;
represent the measurements in Clarke coordinates;
determine Clarke coordinates of a center of a circle defined by the Clarke coordinates of the measurements; and
determine a position of the translator relative to the stator based on the Clarke coordinates of the center of the circle.

2. The apparatus of claim 1, wherein the electric motor is a linear electric motor.

3. The apparatus of claim 1, wherein the power source is a supercapacitor.

4. The apparatus of claim 1, wherein the electric motor lacks a position sensor.

5. The apparatus of claim 1, further comprising a position sensor coupled to the electric motor to detect a position of the translator relative to the stator, wherein the controller is further programmed to receive data indicating the position of the translator relative to the stator from the position sensor, and provide a warning in response to a difference between the position of the translator from the position sensor and the position of the translator based on the center of the circle exceeding a threshold.

6. The apparatus of claim 1, wherein the controller is further programmed to charge the power source with power generated by movement of the electric motor.

7. The apparatus of claim 1, further comprising a vehicle frame and a wheel assembly movable relative to the vehicle frame, wherein the electric motor is coupled to the vehicle frame and to the wheel assembly so that as the wheel assembly moves relative to the vehicle frame, the translator moves relative to the stator.

8. A method for controlling an electric motor including a stator and a translator, the method comprising:
determining at least three flux-linkage measurements at different times from the electric motor;
representing the flux-linkage measurements in Clarke coordinates;
determining Clarke coordinates of a center of a circle defined by the Clarke coordinates of the flux-linkage measurements; and
determining a position of the translator relative to the stator based on the Clarke coordinates of the center of the circle.

9. The method of claim 8, further comprising providing proportional compensation to the center of the circle.

10. The method of claim 9, further comprising providing integral compensation to the center of the circle.

11. The method of claim 9, wherein the proportional compensation is further based on a weighting factor, wherein the weighting factor is inversely related to a condition number of a matrix of the measurements of flux linkage.

12. The method of claim 11, wherein the weighting factor is given by an equation of this form:

$$K_R = \frac{1}{\kappa(A^T A)^x}$$

wherein $K_R$ is the weighting factor, $K(.)$ is the condition number of a matrix, x is a positive number, and the matrix A is given by the following equation:

$$A = \begin{bmatrix} \psi_{\alpha,1} - \psi_{\alpha,2} & \psi_{\beta,1} - \psi_{\beta,2} \\ \vdots & \vdots \\ \psi_{\alpha,N-1} - \psi_{\alpha,N} & \psi_{\beta,N-1} - \psi_{\beta,N} \end{bmatrix}$$

wherein $\Psi\alpha$, i is the ith flux-linkage measurement in the alpha dimension in Clarke coordinates, $\Psi\beta$, i is the ith flux-linkage measurement in the beta dimension in Clarke coordinates, and N is the number of flux-linkage measurements.

13. The method of claim 9, wherein the proportional compensation forms a feedback loop in which a measured back-emf is proportionally compensated and then, after integration, becomes one of the flux-linkage measurements used to determine the Clarke coordinates of the center of the circle.

14. The method of claim 8, further comprising actuating the electric motor based on the position of the translator relative to the stator.

15. The method of claim 8, wherein collecting at least three flux-linkage measurements includes determining at least four flux-linkage measurements, and determining the Clarke coordinates of the center of the circle includes applying least-squares estimation to the Clarke coordinates of the flux-linkage measurements.

16. The method of claim 15, wherein applying the least-squares estimation includes applying this equation:

$$\Psi_c = A^\dagger B$$

wherein $\Psi_c$ is the center of the circle in Clarke coordinates, A and B are matrices given by the following equations, and the dagger symbol represents the pseudoinverse of a matrix:

$$A = \begin{bmatrix} \psi_{\alpha,1} - \psi_{\alpha,2} & \psi_{\beta,1} - \psi_{\beta,2} \\ \vdots & \vdots \\ \psi_{\alpha,N-1} - \psi_{\alpha,N} & \psi_{\beta,N-1} - \psi_{\beta,N} \end{bmatrix}$$

$$B = \frac{1}{2} \begin{bmatrix} \psi_{\alpha,1}^2 - \psi_{\alpha,2}^2 + \psi_{\beta,1}^2 - \psi_{\beta,2}^2 \\ \vdots \\ \psi_{\alpha,N-1}^2 - \psi_{\alpha,N}^2 + \psi_{\beta,N-1}^2 - \psi_{\beta,N}^2 \end{bmatrix}$$

wherein $\Psi\alpha, i$ is the ith flux-linkage measurement in the alpha dimension in Clarke coordinates, $\Psi\beta, i$ is the ith flux-linkage measurement in the beta dimension in Clarke coordinates, and N is the number of flux-linkage measurements.

17. The method of claim 8, further comprising charging a power source with power generated by movement of the electric motor.

18. A controller comprising a processor and a memory storing instructions executable by the processor to:
   determine at least three flux-linkage measurements at different times from an electric motor, the electric motor including a translator and a stator;
   represent the flux-linkage measurements in Clarke coordinates;
   determine Clarke coordinates of a center of a circle defined by the Clarke coordinates of the flux-linkage measurements; and
   determine a position of the translator relative to the stator based on the Clarke coordinates of the center of the circle.

\* \* \* \* \*